US005241446A

United States Patent [19]

Cosley et al.

[11] Patent Number: 5,241,446

[45] Date of Patent: Aug. 31, 1993

[54] OVERVOLTAGE PROTECTOR UNIT FOR WELL CONSTRUCTIONS

[75] Inventors: Michael R. Cosley, Crystal Lake; Arnold M. Ladd, Morton Grove; Casimir Z. Cwirzen, Arlington Heights, all of Ill.

[73] Assignee: Northern Telecom Limited, Montreal, Canada

[21] Appl. No.: 796,587

[22] Filed: Nov. 22, 1991

[51] Int. Cl.$^5$ .......... H02H 9/06

[52] U.S. Cl. .......... 361/119; 361/56; 361/111

[58] Field of Search .......... 361/111, 91, 119, 56, 361/117, 127, 120

[56] References Cited

U.S. PATENT DOCUMENTS 3,849,750 11/1974 Baumbach et al. .......... 337/32
3,885,243 5/1975 Weisshaar et al. .......... 357/79
4,701,825 10/1987 Pagliuca .......... 361/119

*Primary Examiner*—A. D. Pellinen
*Assistant Examiner*—S. Jackson
*Attorney, Agent, or Firm*—Foley & Lardner

[57] ABSTRACT

Overvoltage protector unit for use in a well in which an overvoltage protection device is mounted in a grounding housing and electrically separates a conductor pin in the housing from the housing during normal voltage conditions. The conductor pin is mounted within a flame resistant resilient elastomeric dielectric support which also electrically isolates it from the housing. The support cushions the pin before installation of the unit and the unit is unlikely to suffer damage during storage or transit upon the protection device failing, the resilient support flexes to enable line to ground contact to be established.

13 Claims, 6 Drawing Sheets

OVERVOLTAGE PROTECTOR UNIT FOR WELL CONSTRUCTIONS

This invention relates to overvoltage protector units for well constructions.

In the telecommunications industry, overvoltage protector units are known to protect telecommunications equipment within customer's premises from damage such as could be caused by overvoltage conditions. These conditions may suddenly occur. For instance, an overvoltage condition may be as a result of a lightning strike to an outside line. Some overload protectors are of a design suitable for use in central offices in which an overload protector is provided in each line. Each protector normally includes two overvoltage protection unit devices and two overcurrent protection devices, the protection devices providing individual overvoltage and overcurrent protection for each tip and each ring line.

In other constructions, overvoltage protection units are designed for fitting into wells which are formed by holes provided in a dielectric housing into which such a unit is fitted at one end of the well. A conductor line extends across the other end of the well and contact is made to the conductor line when the protection unit is disposed within the well. These constructions are such that the protector units are manufactured separately from the dielectric housings, the housings being attached permanently to walls of customer's premises and providing with the units the complete overvoltage protector. The protector units are manufactured separately in large quantities to be used, not only upon new facilities, but also as replacements for overvoltage protector units which have been subjected to overvoltage conditions and have failed. It is not uncommon therefore for large quantities of such protector units to be stored in containers or to be carried by maintenance and installation staff to various sites where replacement of protector units is required. As a result, such protector units should be substantially robust to protect them from damage either during storage or in transit.

However, the structure of conventional protector units is such that they may be vulnerable to damage before they have actually been installed and such damage may render them completely unworkable or may make them function incorrectly after installation. Constructional features which render them vulnerable comprises a conductive cup or basket holding within it an overvoltage protection device and a conductor pin which is held within the cup or basket by a ceramic dielectric so that electrical contact with the cup or basket is avoided. The one end of the conductor pin extends from an open end of the cup or basket for contact with conductor the line upon assembly into a well. The ceramic and the conductor pin are held in position by fingers at the open end of the cup or basket, the fingers projecting into an annular groove in the ceramic. The other end of the conductor is electrically in contact with one side of an overvoltage protection device the other side of which is electrically connected to a base of the basket and to ground potential. Any sustained overvoltage condition results in failure of the overvoltage protection device so that grounding of the conductor line takes place through the base of the basket with the fingers making contact with the conductor line under spring pressure.

Because of the geometry of the arrangement, it is necessary for the fingers to project outwardly beyond an open end of a housing which is used to assemble a unit into the dielectric housing. These fingers may become bent during handling or storage and such damage may easily result where a large number of the protector units are gathered together and are randomly and freely movable against each other inside a container. Distortion of one or more of the fingers may result in loosening of the ceramic holding the conductor pin possibly resulting in axial misalignment of the pin and the basket so that inaccurate installation and incorrect operation may occur or short may occur upon installation. In addition, the ceramic material itself may become cracked or broken if a protector unit is dropped thereby affecting the dielectric properties.

The present invention seeks to provide an overvoltage protector unit which will minimize the above problems.

Accordingly, the present invention provides an overvoltage protector unit comprising a housing for assembly into a well, the housing having an open end, a conductor and an overvoltage protection means disposed electrically in an in-series arrangement located at least partly within the housing with a first end of the arrangement electrically connected to the housing and electrically isolated from a second end of the arrangement during normal operating conditions, and the arrangement is also disposed with the second end accessible for the application of an end load in a direction into the open end of the housing, the overvoltage protection means being operable, in use, to fail upon sustaining certain abnormal voltage conditions in a respective signal line, and the conductor mounted within a surrounding flame resistant resilient elastomeric dielectric support means which is resiliently flexed by the end load upon failure of the overvoltage protection means caused by sustained overvoltage conditions so as to cause electrical connection between the first and second ends of the in-series arrangement.

With the above structure according to the invention, no finger arrangement is required to hold the conductor and the dielectric support means. Also, the dielectric support means is a flame resistant resilient elastomeric material thereby avoiding problems with the use of a brittle dielectric support should the protector unit be mishandled.

In one preferred construction a cup member is mounted within and is electrically connected to the housing. An open end of the cup member faces in the same direction as the open end of the housing and the in-series arrangement lies within the cup member. In this structure, resilient means resists movement of the cup member further into the housing.

In an alternative preferred construction, no cup member is provided and the overvoltage protection means is immovably mounted within the housing.

In the preferred constructions, it is preferred that the dielectric support is held by a friction grip within the cup member or the housing as the case may be. Alternatively, the dielectric support means may be disposed in position, for instance, by a suitable adhesive which is compatible both with the material of the dielectric support means and of the cup member or of the housing.

To locate the dielectric support means correctly within the cup member, it is advantageous to provide the cup member and the dielectric support means with interengaging axially extending groove and rib means.

Preferably, this comprises at least three grooves and interengaging ribs spaced apart circumferentially of the cup member and dielectric support means so as to stabilize the dielectric support means within the cup member. In a practical construction, the grooves are formed in the cup member and the ribs upon the dielectric support means.

It is also preferable for the dielectric support means to be prestressed within the cup member or within the housing to prevent the conductor from moving uncontrollably and minimize the possibility of the conductor becoming misaligned relative to the overvoltage protection device should the protector unit be mishandled. Prestressing may be provided with parts of the dielectric support means adjacent to the cup member or housing being held resiliently biassed axially of the conductor beyond a normal unstressed position relative to inner parts of the support means. It is also preferable for the dielectric support means to have radially inner and outer annular walls, the inner wall securely mounting the conductor and the outer wall connected by resilient web means to the inner wall. With such an arrangement the prestressing of the dielectric support takes place about the web means as this allows for axial displacement of the outer wall relative to the inner wall.

Although the overvoltage protection device may comprise carbon or gas tube devices, the protector unit according to the invention is particularly suitable for use with a protection device which comprises a solid state overvoltage protection device.

The invention also includes an overvoltage protector comprising a dielectric body and an overvoltage protector unit, wherein: the dielectric body defines a well and has a first conductor means secured to the dielectric body and extending into the well at a position spaced from an opening to the well; and the overvoltage protector unit comprises a housing having an open end, the housing mounted through the opening and into the well with the open end of the housing facing towards the first conductor means while being electrically isolated from the first conductor means, and with the housing electrically connected to a second conductor means, a conductor and an overvoltage protection means disposed electrically in an in-series arrangement located at least partly within the housing with a first end of the arrangement electrically connected to the housing and electrically isolated from a second end of the arrangement during normal operating conditions, the second end electrically connected to the first conductor means, the overvoltage protection means being operable, in use, to fail upon sustaining certain abnormal voltage differential conditions between the first and second conductor means, and the conductor mounted within a surrounding flame resistant resilient elastomeric dielectric support means; the first conductor means applying an end load to the second end of the in-series arrangement whereby upon failure of the protection means, the second end of the in-series arrangement is caused to move towards the first end during resilient flexing of the dielectric support means to provide an electrical connection between the first and second ends.

Embodiments of the invention will now be described, by way of example, with reference to the accompanying drawings, in which.

Figure 1:
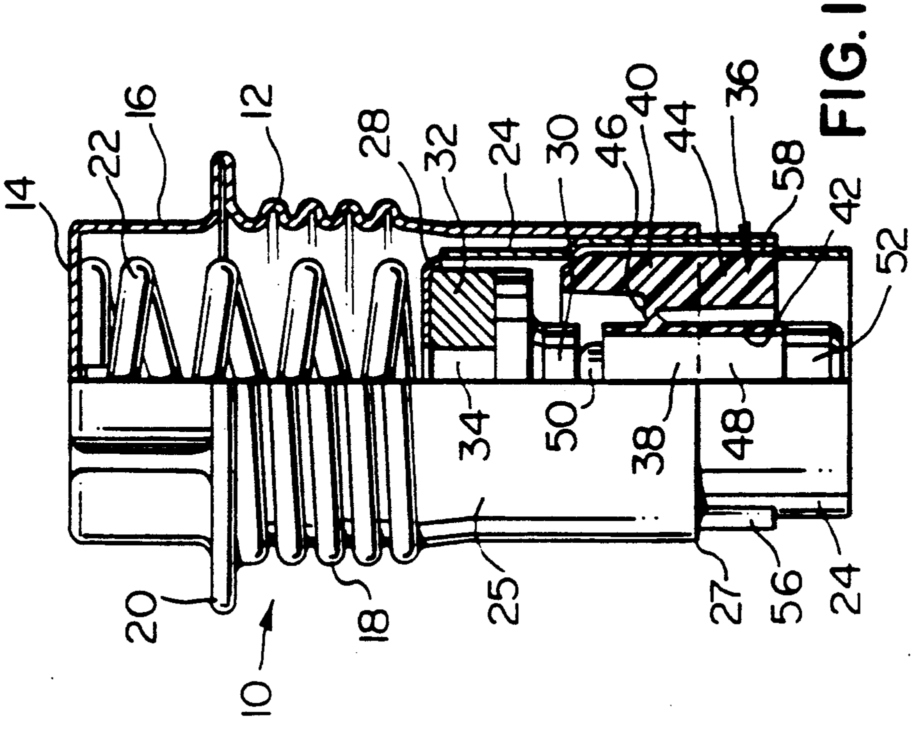
FIG. 1 is a side elevational view in part section of an overvoltage protector unit according to a first embodiment.

In a first embodiment, as shown in FIG. 1, an overvoltage protector unit 10 comprises a drawn metal housing 12 having a closed end 14 at which is provided an hexagonal end region 16 (see FIG. 2) for engagement by a wrench for mounting the housing within a well. For this purpose the housing is formed with a rolled thread 18, and a flange 20 for seating against a dielectric member (to be described) is disposed between the end region 16 and the rolled thread 18.

Within the housing 12 is disposed a resilient means in the form of a compression spring 22 which is engaged at one end against the closed end 14 and has its other end in engagement with a cup member 24 which is slidable within a cylindrical skirt 25 of the housing member 12, the housing being open at a free end 27 of the skirt. The cup member 24 is of substantially cylindrical form shaped from stamped and formed metal strip or sheet and has a cylindrical wall 26 one end of which is formed with abutment means provided by four circumferentially spaced flanges 28 which extend inwardly from the wall 26 towards a common axis of the cup member and the protector unit. The spring 22 rests against the flanges 28 as is clearly shown in FIG. 1. At its other end, the cup member is open and the position of the cup member is such that the open ends of cup member and housing 12 face in the same direction from the protector unit with the cup member extending slightly outwardly beyond the open end of the housing as shown in FIG. 1.

Within the cup member is disposed an overvoltage protection means which comprises a solid state overvoltage protection device 30 of known construction. The device 30 is spaced from the abutment means provided by the flanges 28 by a solder pellet 32 of the overvoltage protection means, the pellet 32 seated against the flanges 28. The solder pellet 32 is of doughnut shape and has a central hole 34.

Within the cup member 24 and below the overvoltage protector device 30 is disposed an assembly 36 of a conductor 38 and a dielectric support means for the conductor 38. The support means is provided by a molded flame resistant resilient elastomeric support capable of withstanding temperatures to which it may be raised during passage of an overvoltage surge through the conductor 38. In this embodiment the support is an olefin based elastomer.

While the dielectric support 40 may be of a solid molded material, it is in this embodiment formed with an inner wall 42 and an outer wall 44 which are connected together during molding by a radially extending resiliently flexible web 46 of annular configuration. The structure of the dielectric support 40 is shown particularly in FIG. 3.

The conductor 38 comprises a conductive pin with a knurled outer surface 48 separating an upper small end 50 and a lower enlarged end 52. The conductor 38 is mounted within the dielectric support 40 during molding of the support so that the inner wall 42 of the support is molded into the knurled surface of the conductor thereby securely fixing the conductor within the inner wall.

Figure 2:
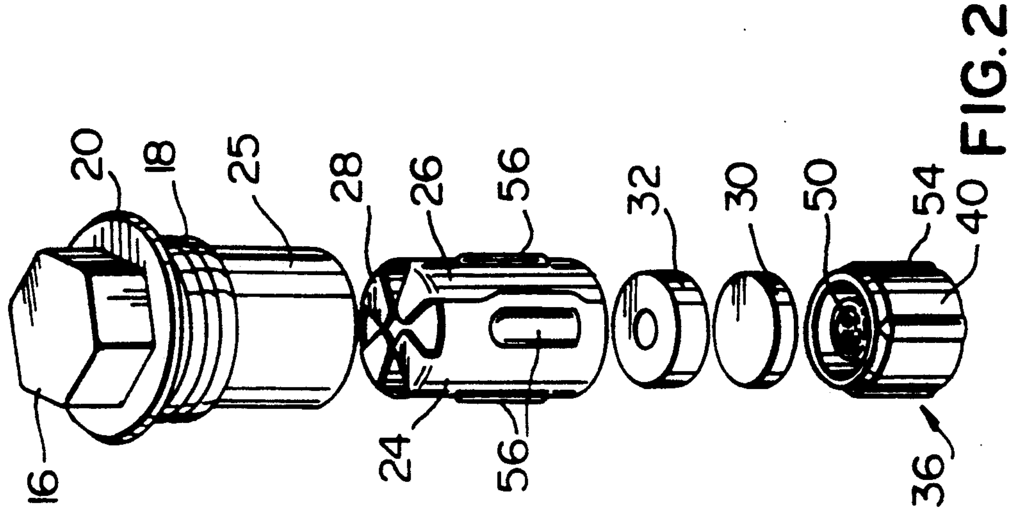
FIG. 2 is an isometric exploded view of the protector unit shown in FIG. 1 and to a smaller scale.

For location purposes within the cup member 24, interengaging axially extending groove and rib means is provided between the cup member and the dielectric support. For complete stabilization, the groove and rib means requires at least three grooves and interengaging ribs spaced circumferentially of the cup member and dielectric support. In this embodiment four ribs 54 are molded in equally spaced positions apart around the outer wall 44 of the cup member as is shown in FIG. 2, each of the ribs extending axially along the outer surface of the outer wall. Similarly, the cup member 24 is pressed with four axially and radially outwardly extending projections 56 which are also equally spaced around the cup member (FIG. 2), these projections forming grooves 58 (FIG. 1) on the inside surface of the cup member.

Figure 3:
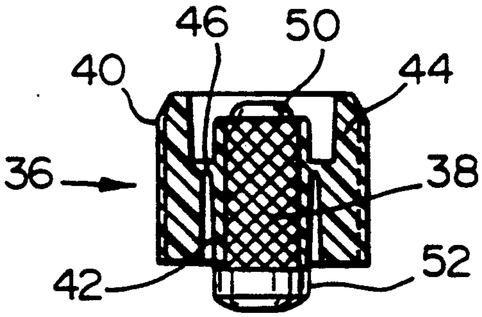
FIG. 3 is a cross-sectional view through part of the protector unit.

As shown by FIG. 3, the dielectric support 40 is molded with the web 46 in an unstressed condition and lying substantially in radial planes of the support. However, upon assembly of the dielectric support into the cup member 24 and upon the complete assembly of the protector unit 10, then the dielectric support is pressed into the cup member and the conductor 38 terminates in its axial movement during insertion upon engagement of its end 50 with the protection device 30 as shown by FIG. 1. The conductor 38 and the overvoltage protection means thus form an in-series arrangement in which they are connected electrically. The outer wall 44 of the dielectric support 40 is pressed further into the cup member 24 so that it moves axially beyond a normal unstressed position relative to the inner wall whereby the web 46 is in a resiliently flexed and stressed condition. This is indicated in FIG. 1 wherein as can be seen, the web 46 in its stressed condition is arched slightly upwardly out of the normal planar condition shown in FIG. 3. The reason for forcing the inner wall into this position within the cup member is to prestress the web 46 and stabilize the inner wall and supported conductor 38 within the cup member so as to resist any tendency of the conductor and the inner wall to move freely under impact loads caused for instance by handling of the protector unit before installation. The position of the conductor 38 is thus controlled and cannot become misaligned with the protector device 30 before installation into a well.

In the assembled condition, the dielectric support 40 is thus assembled into the cup member 24 and is held in position by frictional grip with the ribs 54 engaged within the grooves 58. The cup member 54 has a slight frictional contact with the housing 12 so as to resist any tendency for the cup member to fall completely from the housing.

Figure 4:
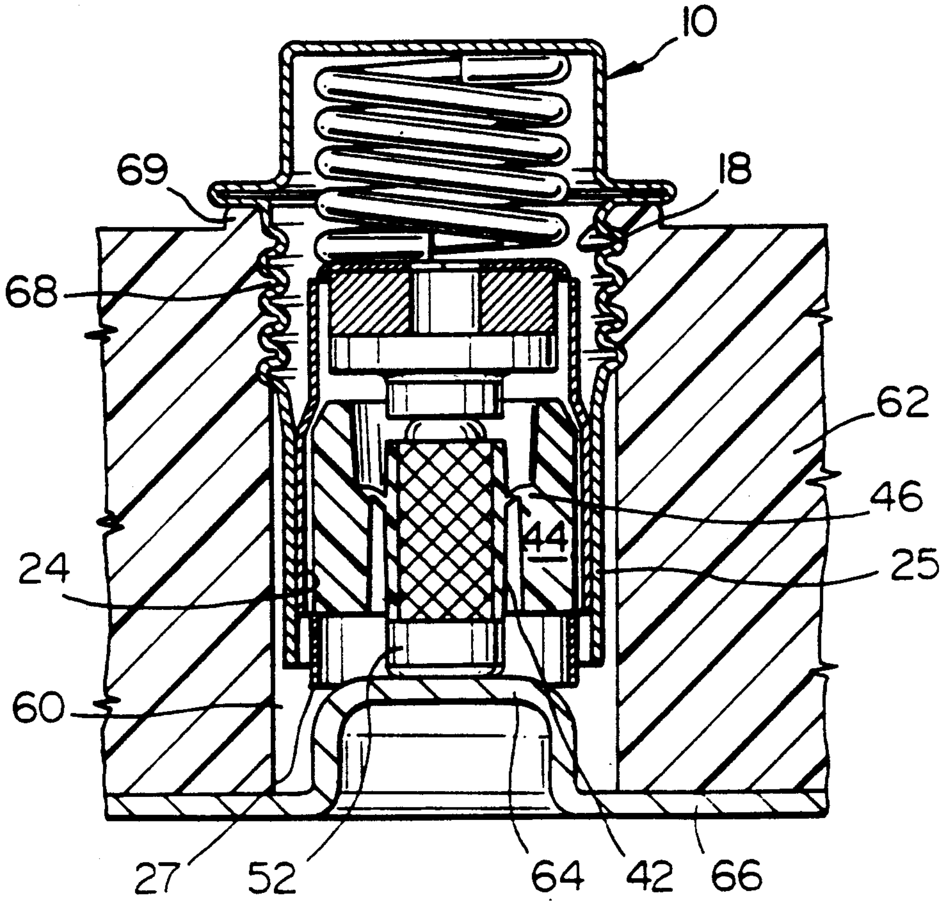
FIG. 4 is a cross-sectional view in side elevation of the protector unit of the first embodiment mounted within a well.

In use and to provide an overvoltage protector, as shown by FIG. 4, the overvoltage protector unit 10 is inserted into a well 60 formed in a molded solid dielectric body 62 secured to the wall of a customer's premises. In the assembled condition the exposed larger end 52 of the conductor 38 engages a conductor means in the form of a domed region 64 of a plate 66 which forms part of the telecommunications line, the domed region extending into one end of the well. The overvoltage protector unit is inserted from the other end of the well with the screw thread 18 screw threadably engaged with a corresponding thread 68 in the hole. During insertion of the unit 10 into the well 60, the domed region 64 in engaging the conductor 38 holds the conductor in position as the housing is screwed downwardly into the well. This causes the domed region 64 to apply an end load against the end 52 of the conductor 38 and axially up into the housing 12, resulting in movement of the cup member 24 towards the closed end 14 of the housing 12 thereby compressing the spring 22 as shown by FIG. 4. In this condition, the cup member 24 while being electrically connected to housing 12 is isolated from the conductor 66, the free end 27 spaced from the domed region 64. At the other end, the housing 12 is permanently connected to ground by a ground conductor (not shown) clamped between an annular ridge 69 of the housing and the flange 20.

Figure 5:
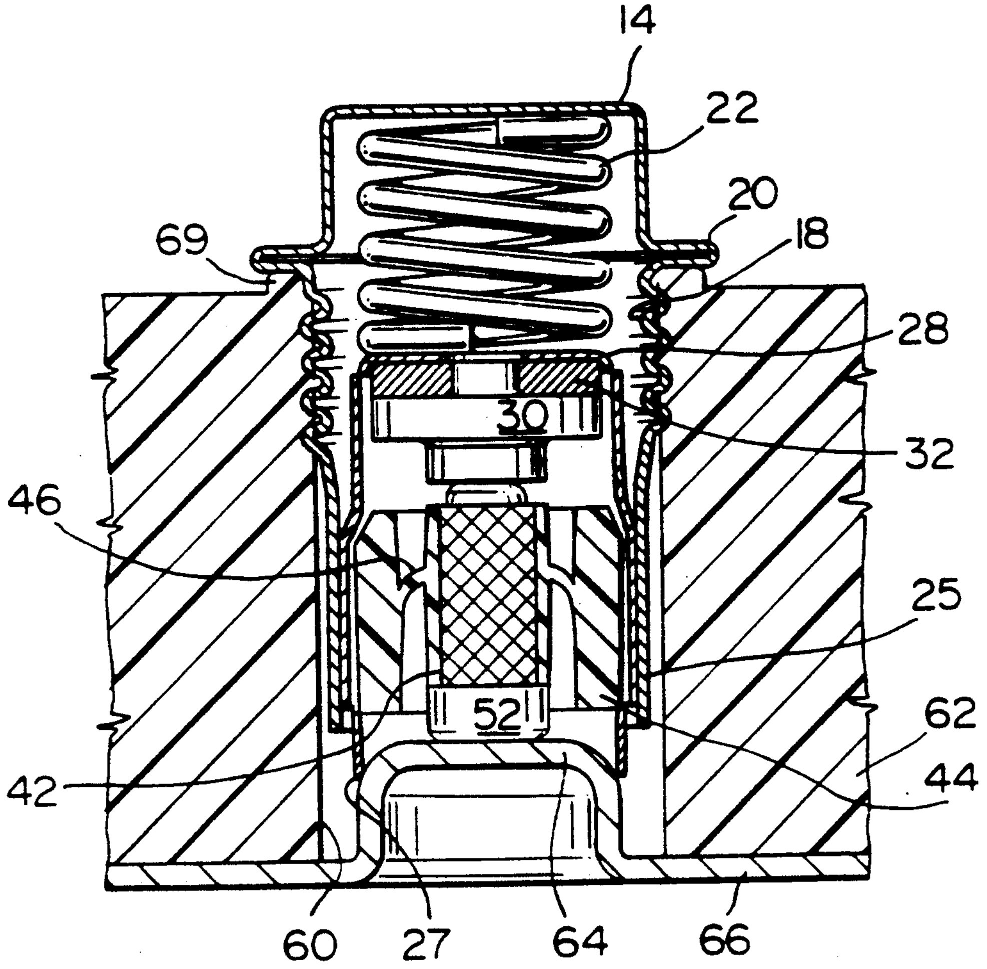
FIG. 5 is a view similar to FIG. 4 showing the positions of parts of the protector unit after failure.

During normal usage, line current passes along the line 66. Upon being subjected to a surge in voltage, a sustained overvoltage condition results in a breakdown in the overvoltage protection device 30 and the solder pellet 32 becomes heated and is melted and is caused to flow partially into the aperture 34 under spring pressure. The removal of the pellet 32 in this fashion results in the spring 22 urging the cup downwardly relative to the conductor 38 so that the lower free end 27 of the cup member 24 engages the domed end 64 of the line 66. This is the position shown in FIG. 5. This movement, as may be seen from a comparison of the positions of the web 46 in FIGS. 4 and 5, results in the outer wall 44 being carried with the cup member axially relative to the inner wall 42 whereby the web 46 returns towards its initial unstressed condition.

As may be seen from the above embodiment, the overvoltage protector unit having the flame resistant resilient elastomeric dielectric support provides a structure which, in a stressed condition within the cup member, holds the conductor 38 in stable condition in axial alignment with the overvoltage protector device 30 during mishandling before installation of the unit into a well. In addition, the support 40 is secured within the cup member by frictional grip thereby eliminating the need for weak holding structures such as fingers to hold a ceramic support in position and which could become broken due to mishandling before insertion into a well.

Figure 6:
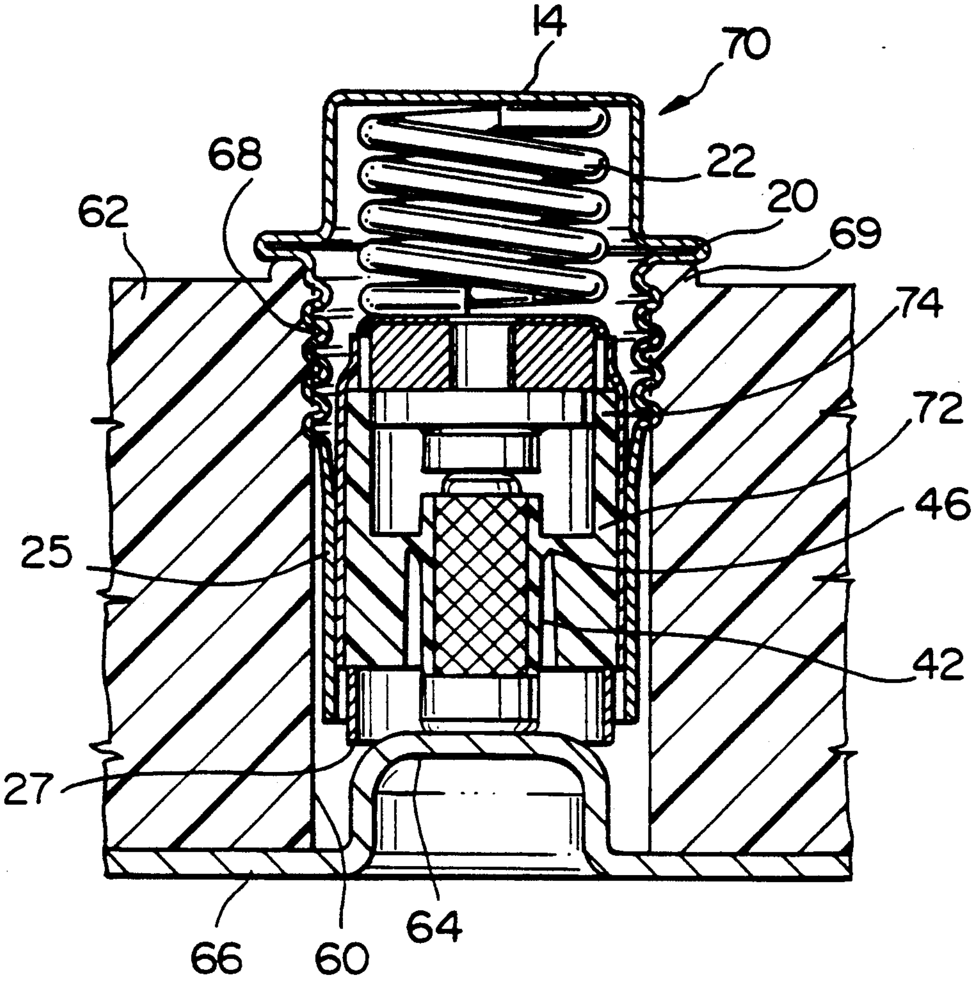
FIG. 6 is a view similar to FIG. 4 of a protector unit according to a second embodiment.

In a second embodiment as shown in FIG. 6, a structure of protector unit 70 is similar to that described for the first embodiment and is also shown inserted into a well 60 in a solid molded dielectric member 62. In this structure, features similar to those described in the first embodiment bear similar reference numerals. The unit 70 differs from unit 10 of the first embodiment in that it has a dielectric support 72 having an inner wall 42 and an outer wall 74 integrally formed together by a web 46 and in which the outer wall 74 extends axially towards the closed end 14 beyond that of the first embodiment. In the second embodiment, the axial extension 76 of the wall 74 is sufficient of the protection device 30. This arrangement is used to simplify the alignment of the parts during assembly of the protector unit.

Figure 7:
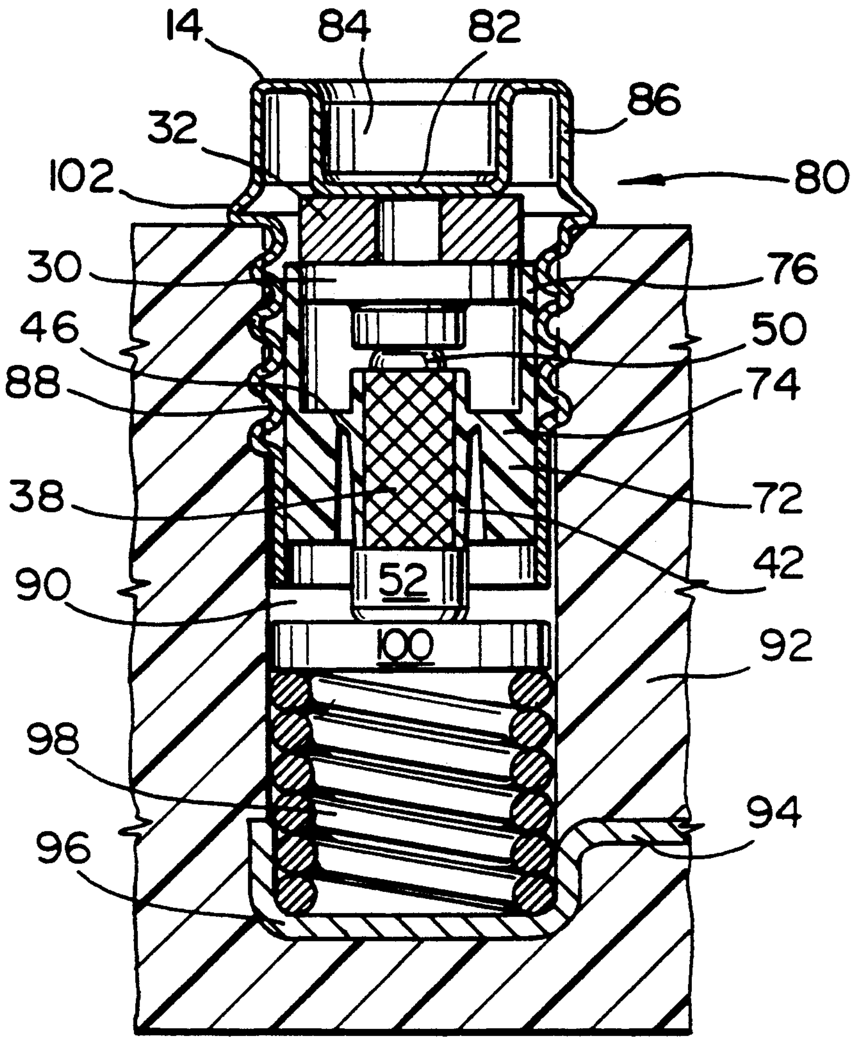
FIG. 7 is a cross-sectional view of a protector unit according to a third embodiment and mounted within a well.
Figure 8:
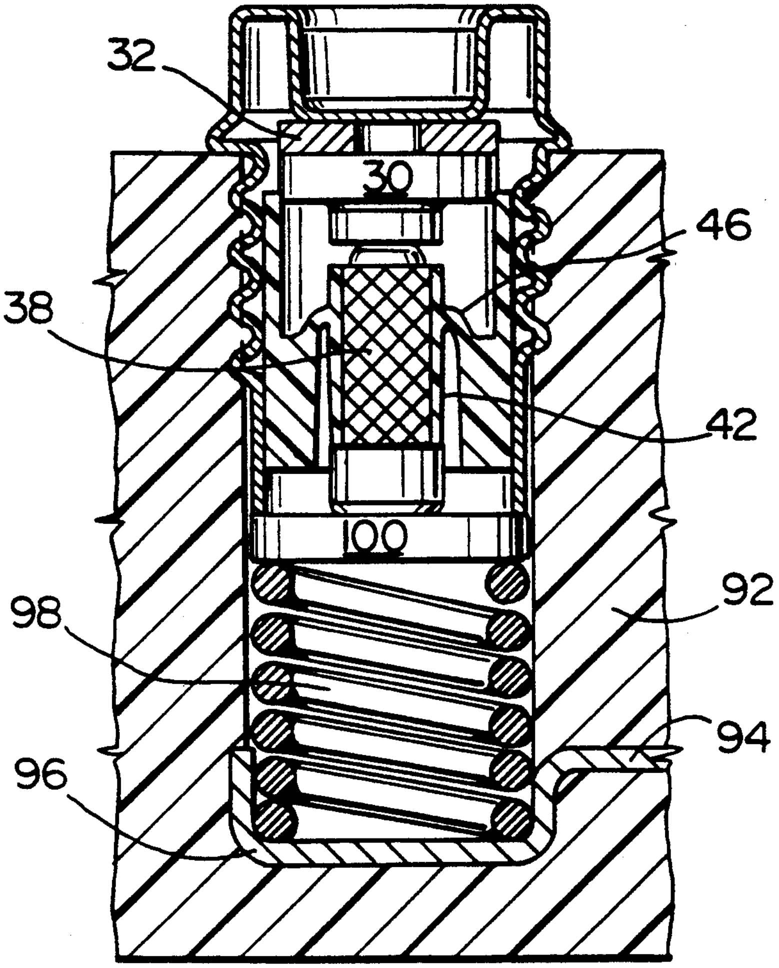
FIG. 8 is a view similar to FIG. 7 showing the positions of parts of the protector unit of the third embodiment after failure.

In a third embodiment shown in FIGS. 7 and 8, a protector unit 80 is of simpler construction than the units of the first and second embodiments in that the unit 80 does not include a resilient means, i.e. a compression spring within its structure and no cup member is provided.

Instead in the unit 80 which bears reference numerals included in the first and second embodiment for similar parts, the in-series arrangement of the conductor 38 and the overvoltage protection device 30 are disposed with the conductor held within the dielectric support 72. As shown, the solder pellet 32 contacts the radial wall 82 forming the base of a cup 84 formed in the closed end 14 of a housing 86. The dielectric support 72 is frictionally held by the inside surface of the partially threaded cylindrical wall 88 of the housing. The axial extension 76 of the wall 74 surrounds the protection device 30 to hold it radially in position and the solder pellet which is bonded to the protection device 30 is thereby also held radially in position.

In assembled condition of the unit, the wall 74 is urged axially beyond its normal unstressed position relative to the inner wall 42 so as to prestress the resiliently flexible web 46 and urge the conductor 38 towards the closed end 14 of the housing 86 thereby holding the solder pellet 32 and protection device 30 axially in position between the radial wall 82 of the cup 84 and the small upper end 50 of the conductor.

The protector unit 80 is incorporated, in use, into a well 90 in a molded solid dielectric body 92 as shown in FIGS. 7 and 8. A line conductor 94 forms a dish 96 at the base of the well, the dish holding one end of a compression spring 98 which is compressed through engagement at its other end with a disc 100 which is urged downwardly by engagement with the lower end 52 of the conductor 38 as the housing 86 is screwed into position within the well.

The spring thus places an end load upon the conductor 38 whereby, upon attainment of a sustained overvoltage condition, the overvoltage protection device 30 fails resulting in melting of the solder pellet as current passes through it and into the housing and the disc 100 is urged by the spring 98 upwards into electrical contact with the lower end of the housing (FIG. 8). This action results in permanent electrical connection between the line conductor 94 and a ground conductor (not shown) held between a flange 102 of the housing and the upper end of the dielectric body 92. The upward movement of the disc 100 causes the conductor 38 and inner wall 42 of the dielectric support also to move upwardly so that the web 46 is flexed.

What is claimed is:

1. An overvoltage protector unit comprising:

a housing for assembly into a well, the housing having an open end;

a cut member mounted within and electrically connected to the housing, the cup member being open at one end and having abutment means extending radially inwards in a position spaced from the open end of the cup member, the cup member mounted within the housing with the open ends of the cup member and housing facing in the same direction;

resilient means for resisting movement of the cup member in a direction further into the housing;

a conductor and an overvoltage protection means disposed electrically in an in-series arrangement within the cup member, with a first end of the arrangement electrically connected to the abutment means and electrically isolated from a second end of the arrangement during normal operating conditions, and the arrangement is also disposed with the second end accessible for the application of an end load in a direction into the open end of the housing, the overvoltage protection means being operable, in use, to fail upon sustaining certain abnormal voltage conditions in a respective signal line, and the conductor mounted within a surrounding flame resistant resilient elastomeric dielectric support means which is held within and by the inside surface of the cup member to electrically isolate the cup member from the conductor, the dielectric support means provided to be resiliently flexed by the end load upon failure of the overvoltage protection means caused by sustained overvoltage conditions so as to cause electrical connection between the first and second ends of the in-series arrangement; and an interengaging axially extending groove and rib means is provided between the cup member and dielectric support means to locate the dielectric support means in a desired position within the cup member.

2. An overvoltage protector unit according to claim 1, wherein the in-series arrangement is disposed with the overvoltage protection means located further from the open end of the housing than the conductor with the conductor providing the second end of the arrangement which is accessible for the application of the end load.

3. An overvoltage protector unit according to claim 1 wherein the groove and rib means comprises at least three grooves each with an interengaging rib, the grooves spaced apart circumferentially of the cup member and the dielectric support means to stabilize the dielectric support means within the cup member.

4. An overvoltage protector unit according to claim 3 wherein the grooves are formed in the cup member and the ribs are provided upon the dielectric support means.

5. An overvoltage protector unit according to claim 1 wherein the dielectric support means is prestressed with radially outer parts of the support held by (the cup) member being held axially of the conductor beyond a normal unstressed position relative to inner parts of the support means.

6. An overvoltage protector unit according to claim 1 wherein the dielectric support means has a radially inner annular wall and a radially outer annular wall, the inner wall securely held by the inside surface of the cup member and the outer wall connected by an annular web means to the inner wall.

7. An overvoltage protector unit according to claim 1 wherein the overvoltage protection device is a solid state overvoltage protection device.

8. An overvoltage protector unit comprising:

a housing for assembly into a well, the housing having an open end; a conductor and an overvoltage protection means disposed electrically in an in-series arrangement located at least partly within the housing with the overvoltage protection means located further from the open end of the housing than the conductor, and with a first end of the arrangement electrically connected to the housing and electrically isolated from a second end of the arrangement during normal operating conditions, the second end being provided by the conductor, and the arrangement is also disposed with the second end accessible for the application of an end load in a direction into the open end of the housing, the overvoltage protection means being operable, in use, to fail upon sustaining certain abnormal voltage conditions in a respective signal line, and the conductor mounted within a surrounding flame resistant resilient elastomeric dielectric support means which has radially outer parts immovably held by the housing, the dielectric support means to be resiliently flexed by the end load upon failure of the overvoltage protection means caused by sustained overvoltage conditions so as to cause electrical connection between the first and second ends of the in-series arrangement.

9. An overvoltage protector unit according to claim 8 wherein the dielectric support means is prestressed with radially outer parts of the support means held by the housing beyond a normal unstressed position relative to inner parts of the support means.

10. An overvoltage protector unit according to claim 9 wherein the dielectric support means has a radially inner annular wall and a radially outer annular wall, the inner wall securely held by the inside surface of the housing and the outer wall connected by an annular web means to the inner wall and the web means is resiliently flexed to hold the dielectric support means prestressed.

11. An overvoltage protector unit according to claim 4 wherein the dielectric support means is held within the cup member by frictional grip.

12. An overvoltage protector unit according to claim 10 wherein the dielectric support means is held within the housing by frictional grip.

13. An overvoltage protector unit according to claim 6 wherein the outer wall is in registration around the overvoltage protection device for location purposes.

* * * * *